United States Patent
Ager

[11] Patent Number: 5,823,884
[45] Date of Patent: Oct. 20, 1998

[54] POWERED STAGE WAGON

[75] Inventor: Mark Allan Nicholas Ager, Isle of Wight, United Kingdom

[73] Assignee: Stage Technologies Limited, London, United Kingdom

[21] Appl. No.: 877,637

[22] Filed: Jun. 20, 1997

[30] Foreign Application Priority Data

Jun. 21, 1996 [GB] United Kingdom ................. 96130869

[51] Int. Cl.⁶ .................................................. A63G 31/08
[52] U.S. Cl. ................................................. 472/77; 472/81
[58] Field of Search .............................. 472/75, 76, 77, 472/78, 79, 57

[56] References Cited

U.S. PATENT DOCUMENTS

| | | | |
|---|---|---|---|
| 2,846,221 | 8/1958 | Skinner | 472/75 |
| 3,558,102 | 1/1971 | Cruse | 472/77 |
| 3,986,703 | 10/1976 | Brett et al. | 472/77 |
| 4,044,853 | 8/1977 | Melke | 180/98 |
| 4,127,182 | 11/1978 | Thole | 180/98 |
| 4,662,628 | 5/1987 | Chateney Epouse Compagnone | 472/77 |
| 4,917,217 | 4/1990 | Rogers et al. | 182/152 |

FOREIGN PATENT DOCUMENTS 1440672 of 0000 United Kingdom.
2126660 of 0000 United Kingdom.

Primary Examiner—Kien T. Nguyen
Attorney, Agent, or Firm—Westman, Champlin & Kelly, P.A.

[57] ABSTRACT

There is described a powered stage wagon comprising a chassis; rolling support structure mounted on the chassis for engagement with a surface over which the stage wagon is to move; and first drive member mounted on the chassis and in engagement with the surface. The drive member is adapted so as to be capable of being orientated in a first direction with respect to the chassis. The stage wagon also comprises second drive member mounted on the chassis and spaced from the first drive member. The second drive member is again in engagement with the surface and capable of being orientated in a second direction with respect to the chassis. Input member are provided for receiving details of a position to which the stage wagon is to move as are computing member for calculating a travel path to enable the stage wagon to move to the position. Finally control member are provided for controlling the first and second drive member so as to move the stage wagon along the travel path.

13 Claims, 3 Drawing Sheets

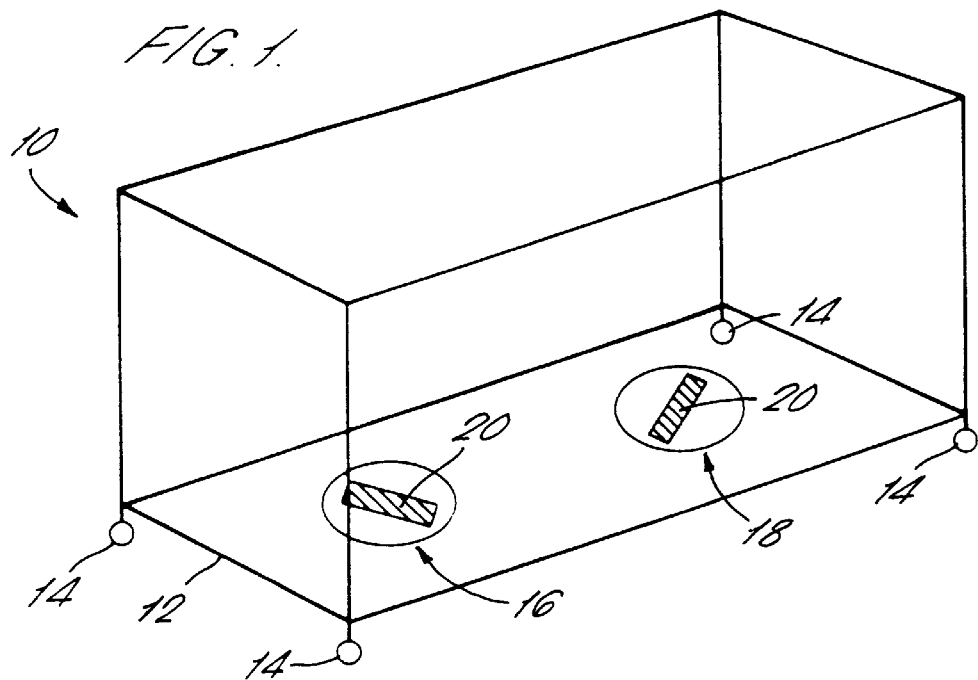
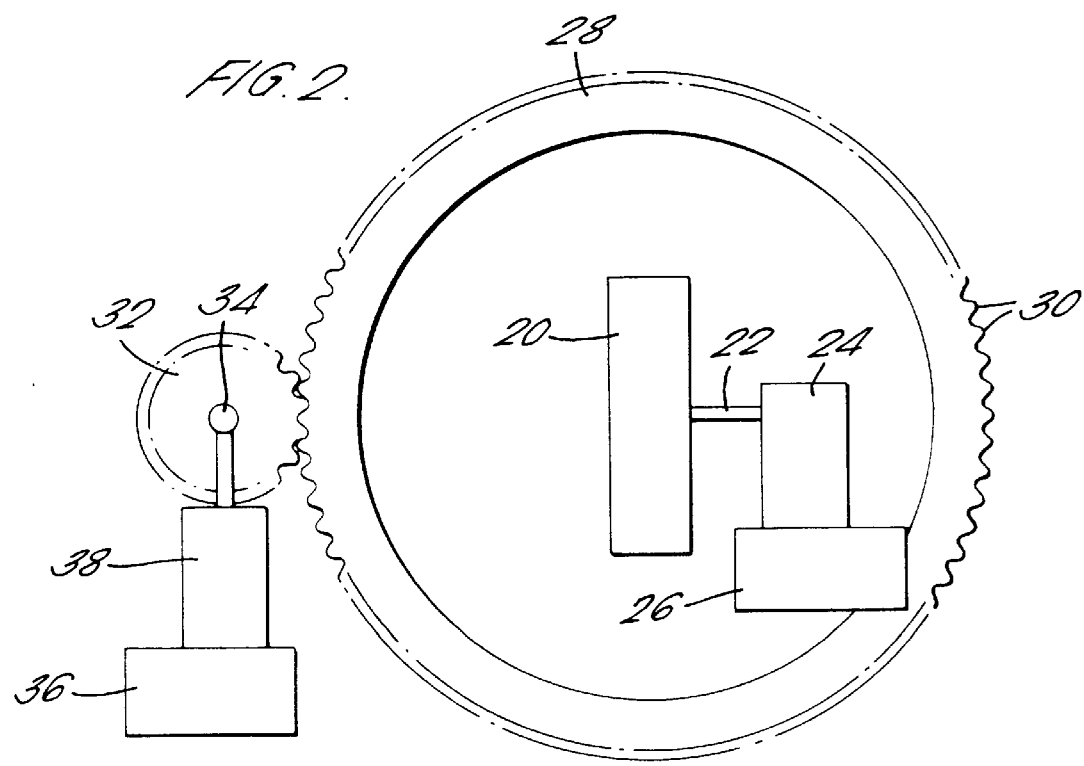

POWERED STAGE WAGON

The present invention relates to theatrical sets, scenery and props and in particular to those set, scenery or prop items which are required to move from a first position to a second position during the course of a theatrical production. In order to achieve this movement the set, scenery or prop items may be mounted on a movable chassis known as a stage wagon and the present invention relates to powered versions of such wagons.

In the past one method of causing various items to move across a stage during a theatrical production has been to attach one end of a winch cable to the item concerned and winch the item across the stage, guiding the movement by means of a runner mounted on the item but which is nevertheless received within a track formed in the stage. Clearly any movement of this sort is limited to a movement back and forth along the track whilst the need for a winch takes up valuable space backstage.

Another method of moving various stage items has been by radio control. This overcame the problem of the movement being limited to back and forth along a particular track but required the presence of a skilled operator standing in the wings in order to steer various items across the stage. Not only did the operator occupy valuable space in a location where there is typically very little but, since the positioning of the stage equipment was under manual control, the system suffered from poor consistency of positioning, particularly where complicated inter-locking set designs were involved.

In order to address the problems of the prior art the present invention provides a powered stage wagon comprising a chassis; rolling support means mounted on the chassis for engagement with a surface over which the stage wagon is to move; first drive means mounted on the chassis and in engagement with said surface, said drive means being capable of being orientated in a first direction with respect to said chassis; second drive means mounted on the chassis and spaced from said first drive means, said second drive means again being in engagement with said surface and capable of being orientated in a second direction with respect to said chassis; input means for receiving details of a position to which the stage wagon is to move; computing means for calculating a travel path to enable the stage wagon to move to said position; and control means for controlling said first and second drive means so as to move the stage wagon along said travel path.

According to a second aspect of the present invention there is also provided a method of calculating a travel path along which a stage wagon may be moved from a current position to a desired position, the stage wagon comprising a chassis, rolling support means mounted on the chassis for engagement with the surface over which the stage wagon is to move; first drive means mounted on the chassis and in engagement with said surface, said drive means being capable of being orientated in a first direction with respect to said chassis; and second drive means mounted on the chassis and spaced from said first drive means, said second drive means again being in engagement with said surface and capable of being orientated in a second direction with respect to said chassis, the method comprising the steps of calculating for each of said drive means the bisector of a line joining the current location of said drive means and the location of said drive means when the stage wagon has moved to its desired position; determining the point of intersection of the two bisectors; calculating for each of said drive means the length of an arc centred on said point of intersection and passing through both the current location of said drive means and the location of said drive means when the stage wagon has moved to its desired position; controlling the ratio of the rotational speeds of the first and second drive means in accordance with the ratio of said arc lengths; and controlling the relative orientation of said first and second drive means so that each of said drive means continuously defines a tangent to the respective arc associated with the drive means concerned.

A number of embodiments of the present invention will now be described by way of example with reference to the accompanying drawings in which:

FIG. 1 is a schematic perspective view of a stage wagon in accordance with an embodiment of the present invention;

FIG. 2 is a schematic plan view of one of the drive means associated with the stage wagon of FIG. 1;

Figure 3:
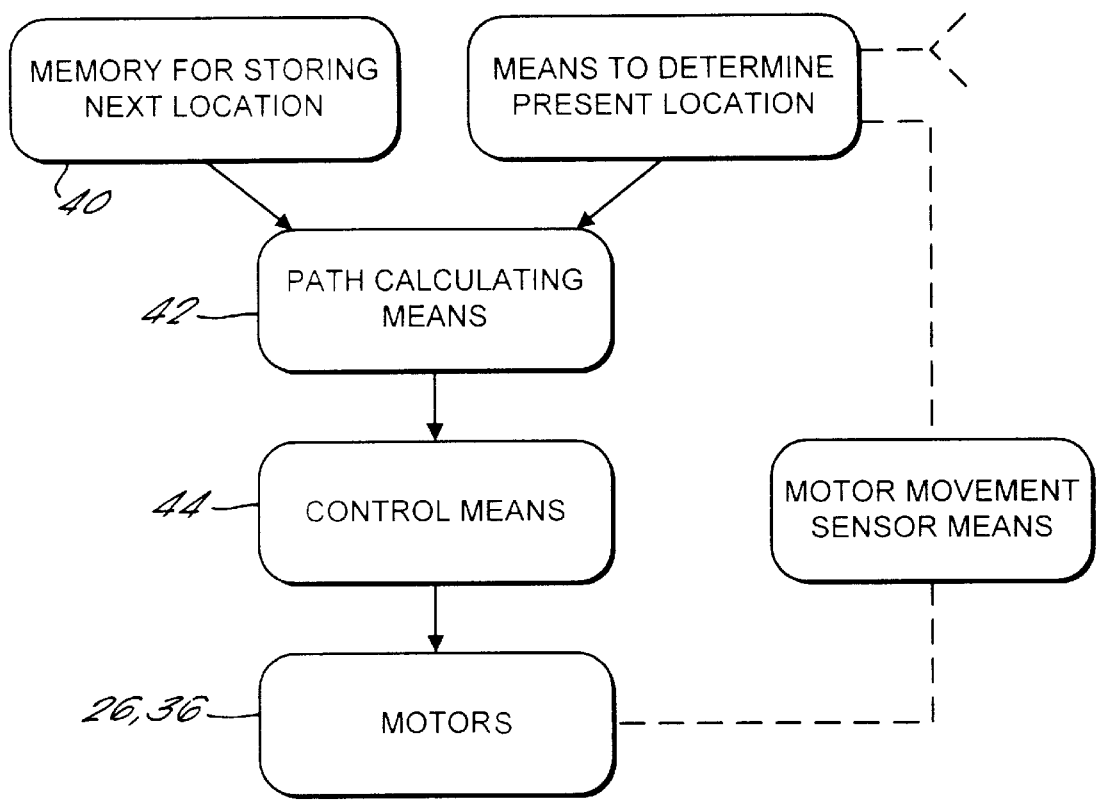
FIG. 3 is a schematic block diagram of a means of controlling the movement of the stage wagon of FIG. 1.

Referring to FIG. 1 there is shown a stage wagon 10 comprising a chassis 12 to which there is mounted a plurality of rolling support means 14. In the particular example shown, the rolling support means 14 comprise heavy duty castors capable of rotating about a generally horizontal rolling axis parallel both to an undersurface of the chassis 12 and also to the surface over which the stage wagon 10 is to move such as the stage of a theatre. Each of the castors is located at a respective corner of the chassis 12 and, as well as rotating about a generally horizontal rolling axis, are also capable of rotating about a generally vertical swivel axis thereby enabling the stage wagon 10 to be moved in any desired direction.

In order to bring about this movement the stage wagon 10 is provided with first and second drive means 16 and 18. These two drive means are both mounted on the chassis 12 in engagement with the surface over which the stage wagon 10 is to move and are mutually spaced. However, apart from their positioning with respect to the chassis 12, the two drive means 16 and 18 are identical and are shown in more detail in FIG. 2. As can be seen, the two drive means 16 and 18 both comprise a wheel 20 which is mounted for rotation about a drive shaft 22 and which is in frictional engagement with the surface over which the stage wagon 10 is to move. At an end of the drive shaft 22 remote from the wheel 20 there is provided both a gear box 24 and a motor 26. The motor 26 drives the drive shaft 22 via the gearbox 24 so as to cause a rotation of the wheel 20.

As can be seen from FIG. 2, the entire assembly comprising the wheel 20, the drive shaft 22, the gearbox 24 and the motor 26 is mounted on a circular support member 28 which is itself mounted for rotation about an axis perpendicular to the drive shaft 22. The circular support member 28 is provided on its circumference with a plurality of teeth 30 which mesh with a toothed wheel 32 located adjacent the circular support member and which is again mounted for rotation about an axis 34 perpendicular to the drive shaft 22. The toothed wheel 32 is rotatably driven about this axis 34 by means of a second motor 36 and via a second gearbox 38. Thus by actuating the second motor 36 it is possible to cause the rotation of both the toothed wheel 32 and the circular support member 28 and thereby alter the relative orientation of the wheel 20 with respect to the surface over which the stage wagon 10 is to move. Likewise, by actuating the first motor 26 it is possible to control the speed with which, and the distance over which, the stage wagon 10 moves in the direction determined by the second motor 36.

In order to move the stage wagon 10 from a first position in which it is currently located to a second position, input means in the form of memory means 40 are provided for storing details of at least that second position since the second position can be defined in terms relative to the present position. These positional details may include details of the desired location to which the stage wagon 10 is to move and also the desired orientation the stage wagon is to adopt having moved to that location. However, in an alternative embodiment, where, for example, the stage wagon possess rotational symmetry or where it is to maintain the same relative orientation, the positioning details may simply comprise details of the desired location to which the stage wagon is to move. These positional details are fed to a computing means 42 which calculates a travel path along which the stage wagon 10 is to move in order to reach the said second position. Details of this travel path are then fed to a control means 44 which controls the speed of movement, the direction of movement and the duration of movement of the first and second drive means 16 and 18 by sending appropriate control signals to the first and second motors 26 and 36 associated with each of the two drive means.

Figure 4:
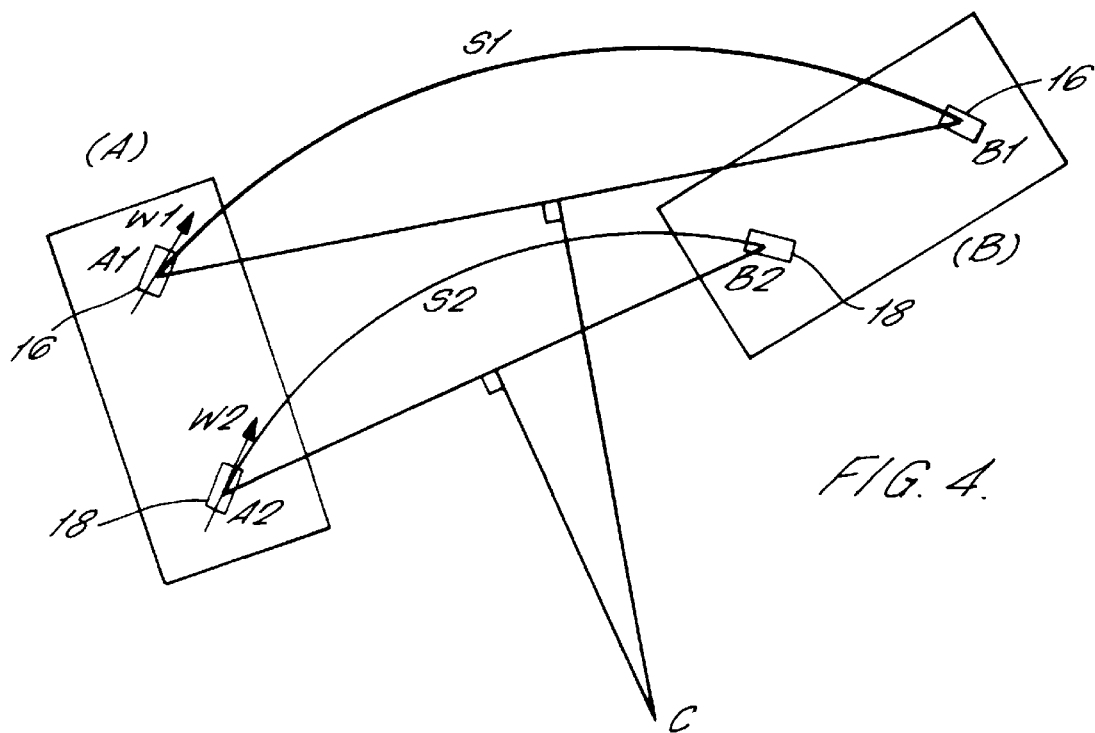
FIG. 4 is a geometrical representation of a method of calculating a travel path to enable the stage wagon to move from a first position to a second position.
Figure 5:
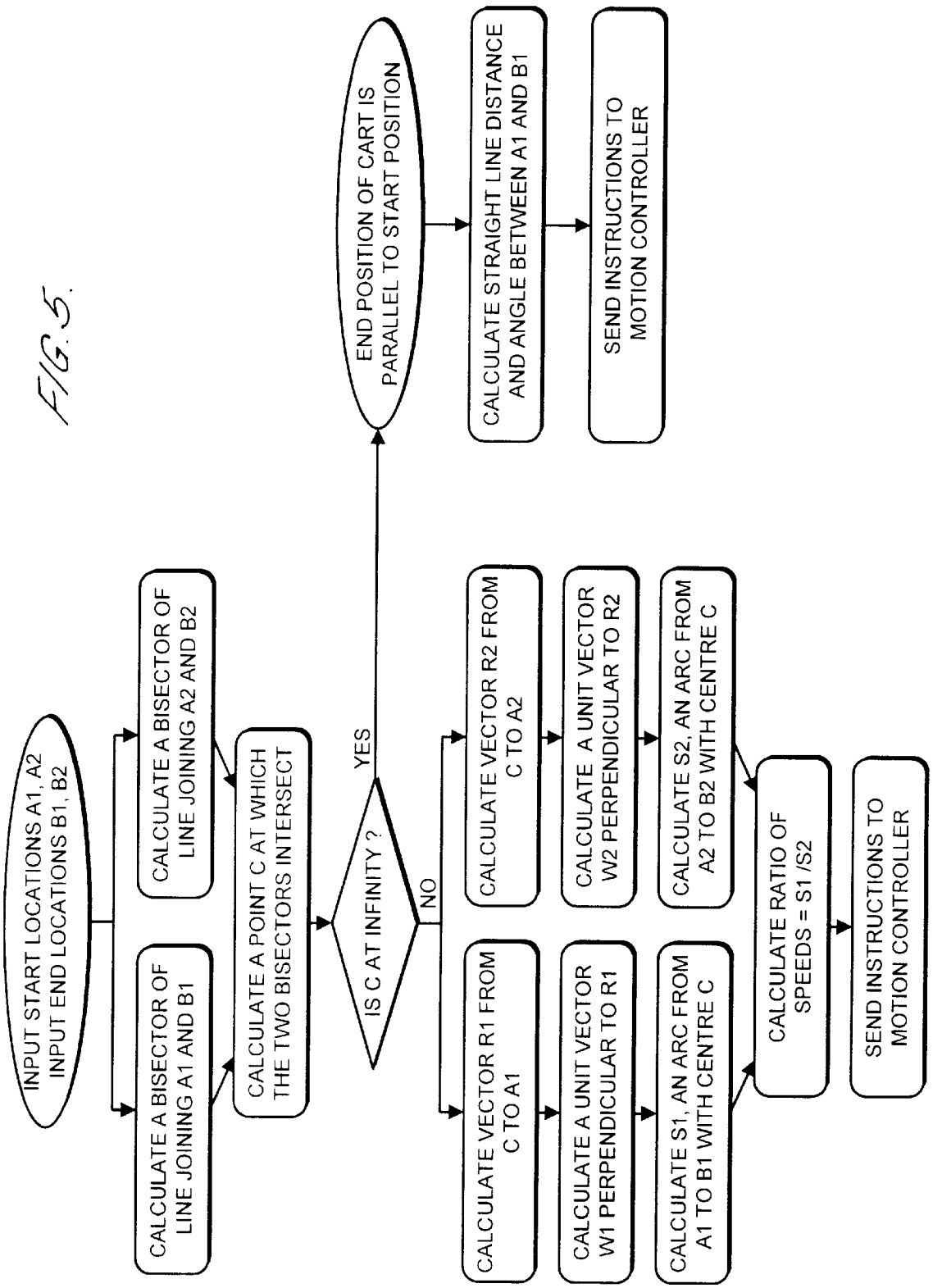
FIG. 5 is a flow diagram indicating the steps involved in the method of calculation illustrated in FIG. 4.

One method of calculating the travel path between a generalised first position (A) and generalised second position (B) is illustrated in FIGS. 4 and 5. First a number of positions need to be defined. These include the desired end positions of the two drive means 16 and 18. These end positions B1 and B2 can either be defined relative to the starting positions of the two drive means A1 and A2 or else can be defined in terms of an alternative coordinate system in which case it will also be necessary to define the starting positions A1 and A2 in terms of the same coordinate system. Having defined these positions, the next step is to calculate for each drive means the bisector of a line drawn between their starting and end positions, ie the bisector of a line drawn between A1 and B1 and of a line drawn between A2 and B2. This may be done by first calculating the midpoint of the line concerned and then drawing a further line perpendicular to the first and passing through the midpoint. Once this has been done for both of the two drive means 16 and 18, it is then necessary to find the point of intersection of the two bisectors which in FIG. 4 is at point C. This point defines the centre of a circle about which the stage wagon needs to rotate in order to move smoothly from the first position to the second position. It should be noted however, that the centre of this circle may be at infinity if the stage wagon 10 is to move in a straight line. Knowing the position of point C it is possible to construct two arcs centred on point C, a first arc (S1) joining positions A1 and B1 and a second arc (S2) joining positions A2 and B2. Generally speaking the length of these two arcs (S1 and S2) will be different and defines the distance that it will be necessary for the respective drive means 16 and 18 to travel. In order that the two drive means 16 and 18 may both arrive at their desired end positions simultaneously this difference in arc length necessitates the two ground engaging wheels 20 to generally be driven at different speeds. Thus the ratio between the two arc lengths (S1/S2) defines the ratio of the speed of rotation of the two ground engaging wheels 20 and indeed the two drive shafts 22, while their absolute speeds of rotation are determined by the time it is desired that the stage wagon take in moving from the first position to the second position.

As for the relative orientation of the ground engaging wheel 20, this is determined for each of the drive means at any point along the travel path by the direction of the tangent W1 or W2 to the arc concerned.

In order that neither of the drive means 16 or 18 may experience any undue slippage between their respective surface engaging wheels 20 and the surface over which the stage wagon is to move, each wheel may be slowly accelerated to the desired rotational speed whilst maintaining the desired ratio between the two in accordance with the ratio of the arc lengths to be travelled and whilst ensuring that the stage wagon moves from the first position to the second position in the desired time interval. This also has the advantage of ensuring that the stage wagon 10 moves about the stage smoothly and without any jolts which might unbalance any actors or actresses sitting or standing on the wagon at the time.

As stated previously, the details of the position to which the stage wagon 10 is to be moved can be expressed in terms relative to the position of the stage wagon immediately prior to that move taking place. Alternatively, the position to which the stage wagon 10 is to be moved can be expressed in an alternative coordinate system in which case it will be necessary to identify the current location of the stage wagon using that same coordinate system. This may be achieved in a number of different ways.

In a first arrangement means may be provided to sense the number of revolutions performed by the surface engaging wheels 20 of the two drive means 16 and 18 and the relative orientation of the wheels with respect to the chassis 12. In this way a past history of movement can be calculated and the present location of the stage wagon 10 can be stored in the memory means 40 where it may be constantly overwritten as the stage wagon continues to move over the surface.

One of the drawbacks with this arrangement however, is that it takes no account of any slippage between the surface engaging wheels 20 and the surface over which the stage wagon 10 is to move. As a result the position of the stage wagon 10 calculated on the basis of the history of movement of the ground engaging wheels 20 may be very different from the position of the stage wagon in reality since each error due to slippage will be compounded by the next. In a theatrical performance in which a large number of movements of the stage wagon are required this can lead to dangerous and unpredictable consequences.

In an alternative system means may be provided to independently establish the position of the stage wagon 10 with respect to the surface over which it is to move. In one arrangement for example the stage wagon 10 may be fitted with two mutually spaced sensors which emit an ultrasonic pulse when triggered by an infrared pulse. The ultrasonic pulse is then detected by a plurality of detectors arranged around the stage and the response time between the emission of the infrared pulse and the detection of the ultrasonic pulse can be used to calculate not only the location of the stage wagon 10 but also its relative orientation. Sensors and detectors of this type are well known in the theatre and are sold under the trade mark "WYBRON" by Wybron Inc of 4830 List Drive, Colorado Springs, Colo. 80919, United States of America.

Having independently established the position of the stage wagon 10 (ie both its location and its relative orientation) this information may be transferred to the memory means 40 or direct to the computing means 42 by means of a radio or similar cordless link. In this way even if the surface engaging wheels 20 were to experience some slippage while executing a move from a first position to a second position so that the second position reached was not quite the second position intended, when the stage wagon then executed a move to a third position the error would not be compounded since its true starting position could be established independently of the first and second drive means 16 and 18 In In a currently preferred embodiment the true position of the stage wagon 10 is only determined prior to executing its next movement. However, in an alternative arrangement the true position of the stage wagon can be repeatedly established and fed back to the computing means 42 so that even if the surface engaging wheels 20 should experience some slippage a fresh travel path can be calculated so as to correct for any deviation while the stage wagon is still moving and before it reaches its next desired position. Although the stage wagon has been described as including memory means, computing means and control means it will be apparent to those skilled in the art that one or more of these means may be located remotely from the wagon with control signals being sent to the motors associated with the first and second drive means 16 and 18 via a radio or other cordless link. This has the advantage of reducing the weight that has to be carried by the stage wagon and so enables the drive means to be of reduced size.

I claim:

1. A powered stage wagon comprising a chassis; rolling support means mounted on the chassis for engagement with a surface over which the stage wagon is to move; first drive means mounted on the chassis and in engagement with said surface, said drive means being capable of being orientated in a first direction with respect to said chassis; second drive means mounted on the chassis and spaced from said first drive means, said second drive means again being in engagement with said surface and capable of being orientated in a second direction with respect to said chassis; input means for receiving details of a position to which the stage wagon is to move; computing means for calculating a travel path to enable the stage wagon to move to said position; and control means for controlling said first and second drive means so as to move the stage wagon along said travel path.

2. A powered stage wagon in accordance with claim 1, wherein one or both of said first and second drive means comprises rolling support means in frictional engagement with said surface and operable to be rotatably driven about a rolling axis.

3. A powered stage wagon in accordance with claim 2, wherein said rolling support means is additionally adapted to be independently rotatably driven about a swivel axis generally perpendicular to said rolling axis.

4. A powered stage wagon in accordance with claim 1, wherein the position details received by said input means are expressed relative to a current position of the stage wagon.

5. A powered stage wagon in accordance with claim 1, wherein said computing means calculates said travel path based on details of the current position of the stage wagon as well as details of the position to which the stage wagon is to move.

6. A powered stage wagon in accordance with claim 5, wherein details of the current position of the stage wagon are calculated on the basis of the history of movement of said first and second drive means.

7. A powered stage wagon in accordance with claim 5, and further comprising means for determining the current position of the stage wagon independent of the first and second drive means.

8. A powered stage wagon in accordance with claim 7, wherein the current position of the stage wagon is determined with sufficient frequency and fed back to the computing means to enable a revised travel path to be calculated while the stage wagon is moving to the desired position.

9. A powered stage wagon in accordance with claim 5, wherein the current position of the stage wagon is determined prior to calculating said travel path.

10. A powered stage wagon in accordance with claim 1, wherein said position details include details of both location and orientation.

11. A powered stage wagon in accordance with claim 1, wherein one or more of said input means, computing means and control means are located remotely from the stage wagon.

12. A powered stage wagon in accordance with claim 1, wherein said computing means performs the steps of calculating for each of said drive means the bisector of a line joining the current location of said drive means and the location of said drive means when the stage wagon has moved to its desired position; determining the point of intersection of the two bisectors; and calculating for each of said drive means the length of an arc centred on said point of intersection and passing through both the current location of said drive means and the location of said drive means when the stage wagon has moved to its desired position, and said control means controls the ratio of the rotational speeds of the first and second drive means in accordance with the ratio of said arc lengths and controls the relative orientation of said first and second drive means so that each of said drive means continuously defines a tangent to the respective arc associated with the drive means concerned.

13. A method of calculating a travel path along which a stage wagon may be moved from a current position to a desired position, the stage wagon comprising a chassis, rolling support means mounted on the chassis for engagement with the surface over which the stage wagon is to move; first drive means mounted on the chassis and in engagement with said surface, said drive means being capable of being orientated in a first direction with respect to said chassis; and second drive means mounted on the chassis and spaced from said first drive means, said second drive means again being in engagement with said surface and capable of being orientated in a second direction with respect to said chassis, the method comprising the steps of calculating for each of said drive means the bisector of a line joining the current location of said drive means and the location of said drive means when the stage wagon has moved to its desired position; determining the point of intersection of the two bisectors; calculating for each of said drive means the length of an arc centred on said point of intersection and passing through both the current location of said drive means and the location of said drive means when the stage wagon has moved to its desired position; controlling the ratio of the rotational speeds of the first and second drive means in accordance with the ratio of said arc lengths; and controlling the relative orientation of said first and second drive means so that each of said drive means continuously defines a tangent to the respective arc associated with the drive means concerned.

* * * * *